Dec. 5, 1939.  L. A. GOODMAN  2,181,886
SAUSAGE CASING
Original Filed May 23, 1935

INVENTOR
LEO A. GOODMAN.
BY
ATTORNEY

Patented Dec. 5, 1939

2,181,886

UNITED STATES PATENT OFFICE 2,181,886

SAUSAGE CASING

Leo A. Goodman, Brooklyn, N. Y., assignor of one-half to Marcleph & Co. Inc., New York, N. Y., a corporation of New York Application May 23, 1935, Serial No. 22,931
Renewed March 7, 1939

6 Claims. (Cl. 99—176)

This invention relates to casings for sausages or other meat products, and more particularly to the production of a material for making an artificial sausage casing, which material has properties simulating those of natural gut.

Casings for sausage meats now commonly used are generally made of natural gut consisting of the intestines or entrails of hogs, ox, sheep, or other animals. Natural gut casings are objectionable in that they are subject to putrescence, with the accompanying fetid odor, and to numerous other disadvantages from a sanitary standpoint. The casings must be thoroughly cleaned and sterilized before using to destroy all bacteria. They must be carefully graded for size and quality. These factors all tend to increase the cost of natural gut casings.

The present invention has for an object to provide an artificial casing having the desirable properties and qualities of a natural gut casing but which eliminates the undesirable characteristics thereof.

My invention provides a sanitary and relatively inexpensive substitute for the natural gut casings heretofore used. The invention lends itself particularly to the manufacture of large size casings, such as are known in the packing industry as "hog bungs" and used for casing liver sausages or the like, but it is to be understood that I do not limit myself in this respect.

Broadly considered, this invention consists in producing a finely porous, non-toxic, sanitary, elastic material derived from that class of substances in which are included natural or synthetic rubber or rubber-like materials. In the manufacture of sausage casings, this microporous elastic material may be used as such, or it may be applied or attached, in any suitable manner, to a fabric base of the character hereinafter described. The microporosity may in general be produced by uniformly distributing small amounts of compatible soluble bodies in dispersions of the rubber or rubber-like substances, and then washing out or removing these introduced soluble bodies with water. Other solvents which are solvents for said bodies but are non-solvents for, or have only negligible solvent action on, the rubber or rubber-like substances may be used.

The casing material of this invention is porous, preferably microporous, that is to say, it may have very small pores of substantially the order of the pores of natural gut. A casing made of this material upon a fabric foundation has the necessary mechanical strength to permit the sausage meat being forced into the casing in the usual sausage machine or stuffer, without danger of tearing the casing. Furthermore, such material is of uniform strength throughout. This is an advantage over natural gut because in making natural gut casings, the fat is sometimes scraped off more closely at certain parts than at others, thus leaving weakened areas or spots which are liable to burst in filling the casing.

My artificial casing is elastic circumferentially and will expand or contract uniformly with the swelling or shrinking of the sausage meat both in the process of making the sausage and in storage. This provides a product in which the meat will not separate or shrink away from the casing. The material can be easily cut with a knife or slicer, and when the sausage is sliced, the casing can be readily peeled off. The casing will not become putrid, rancid or moldy, and is capable of being kept for an indefinite period of time without deterioration.

It has been found in practice that sausage meat encased in my artificial casing will remain fresh and be preserved for a much longer time than when contained in a natural gut casing. When used as a casing for liver sausage, it has been found to prevent the formation of so-called "jelly pockets". Furthermore, the material protects the meat and prevents the surface in contact with the inside of the casing from darkening. At present, liver sausages cased in hog bungs tend to darken quite readily. The fact that the meat will not darken in my artificial casing is a surprising result and is probably due to the character of the structure of the casing as well as to the nature of the components of the material.

Casings made according to this invention are hygienic, uniform in size and quality, and do not require any changes in the meat formulae, or in the processes or apparatus now used in sausage making, or in curing, smoking or otherwise preparing the sausage meat. The casing material may be opaque and colored, as, for example, to simulate the color of a natural hog bung liver sausage casing, or it may be translucent to permit the color of the meat to show through.

In one manner of carrying out my invention, I prepare a compound of latex or of suitable rubber dispersion, formed either with natural or synthetic rubber, and then apply a coating of the compound upon a base of stretchable fabric, preferably a knitted fabric. The coating is then dried, or coagulated and dried, vulcanized, and treated, as by immersion in boiling water, to produce small pores or micropores in the coating material. The resultant product comprises a stretchable fabric base to which is firmly and integrally united a coating of microporous elastic vulcanized rubber. While for use in making larger size casings, such as liver sausage or bologna casings, I prefer to affix the coating to a fabric base, I do not necessarily limit the invention to a casing having a fabric base because smaller sized casings, where increased strength and controlled elasticity are not essential factors, may be made of the microporous vulcanized latex compound alone without the base.

One embodiment of the invention is illustrated in the accompanying drawing, wherein.

Figure 1:
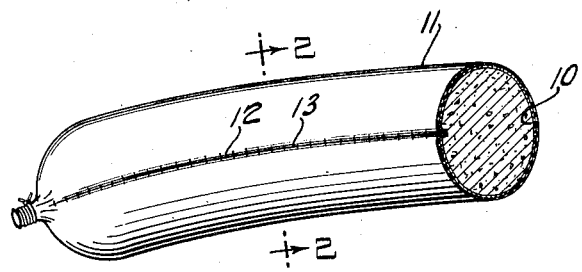
Figure 1 is a perspective view of a cut length of sausage.
Figure 2:
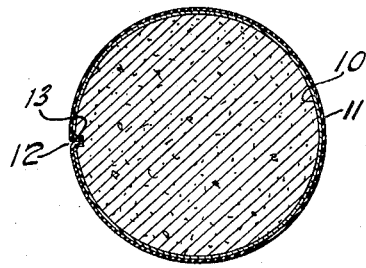
Fig. 2 is a cross section, on an enlarged scale, taken on the line 2—2 of Figure 1.

Referring to the drawing, the casing therein shown comprises an inner fabric layer or base 10 having a coating 11 on its outer surface of latex or suitable rubber compound. In this particular form illustrated which is a larger casing such as used on liver sausages, the casing has a longitudinal seam 12 united by stitching 13. In forming the casing, the material is stitched with the coated surface on the inside, and then turned inside out to form a tube. A seamed casing simulates the appearance of a certain type of hog bung casing, known as the "export type", which latter is usually sewed. However, if desired, the casing may be made seamless by first forming a tube of the fabric, on a mandrel or otherwise, and then coating the tube with the latex compound. The ends of the casing may be tied, sewed, or closed in any manner.

The fabric employed as the base is preferably a knitted fabric made of yarns or threads of artificial silk, natural silk, cotton, or other fibre. The fabric is knitted to afford considerable elasticity in one direction, generally in a direction crosswise of the web or sheet. In making the casing, the fabric is used so that its maximum stretch will occur circumferentially of the casing. While I have found that a knitted fabric of viscose rayon is particularly suitable for use in making the casing, other fabrics made of other materials may be used provided that the fabric is of such character as to have the desired circumferential elasticity when formed into a tube.

The latex compound or rubber dispersion used for impregnating and coating the fabric may be made in known manner. Vulcanizers, accelerators and antioxidants, such as are usually employed in making rubber compounds, are added to the mixture and are intimately incorporated with the latex or dispersed rubber. Ultra-accelerators of the type of butyl zimate are preferred because they will facilitate rapid vulcanization at comparatively low temperatures. Any non-toxic fillers, pigments, or dyes, such, for example, as clay, whiting, kaolin, titanium oxide, insoluble vat dyes, or the like, may be added.

The latex used in making the coating compound is preferably one having a high concentration of rubber solids, that is, one prepared by evaporating the fresh latex to high concentration of solids and one in which all of the serum components, such as the proteins, aldehydes, sugars, etc., are retained. The retention of all of the components of the fresh latex has been found beneficial for two reasons, firstly: because it aids in the curing of the material, and secondly: because the removal of the water soluble bodies by boiling after vulcanization aids in obtaining the desired microporosity.

Latex compounds for making sausage casings may be composed of the following constituents in substantially the proportions indicated:

| | Parts by weight |
|---|---|
| Rubber (in the form of concentrated latex containing about 70% rubber) | 100 |
| Sulphur | .75 to 1 |
| Antioxidant | .75 to 1 |
| Accelerator | .75 to 1 |
| Gum karaya or methyl cellulose | .75 to 3 |
| Kaolin | 1 to 8 |
| Titanium oxide | .5 to 1 |

The ingredients above mentioned are introduced into the stabilized latex as colloidal aqueous dispersions. The gum karaya, or the methyl cellulose, as the case may be, is used to increase the viscosity of the concentrated latex solution and to aid in inducing porosity in the vulcanized coating. Gelatin, casein, water soluble starch, or other water soluble gums may be substituted. The kaolin and the titanium oxide give the compound the desired color simulating that of a hog bung liver sausage casing. If a translucent material is desired, these ingredients may be omitted or used only in very small amounts.

The latex coating compound may be applied to one or both surfaces of the fabric. Preferably, I first apply a thin layer which will impregnate the fabric and then additional layers are applied to build up a fabric of desired thickness. The several layers may be dried, or coagulated and dried, separately or together. Coagulation may be effected by any suitable coagulant, such as, for example, acetic acid.

Curing or vulcanization of the dried latex coating may conveniently be done in two stages. First, by heating for a sufficient length of time at a temperature sufficiently high to partially vulcanize the rubber, and then by immersion in, or treatment with, boiling water, to complete the vulcanization. The treatment with boiling water also washes out and removes the soluble bodies originally present in the latex as well as those introduced into the compound and those that may have been formed during coagulation. This treatment produces a vulcanized rubber film or coating having minute pores formed by washing out the soluble particles.

While I prefer to employ the latex compound as a coating for a fabric, it may, as heretofore stated, be used to make a microporous film which may be used with or without a fabric base, or which may be subsequently attached to a fabric base either before or after the film has been completely vulcanized and made porous.

It has been found that a material produced in this manner has many of the desirable characteristics, of natural gut, especially that of porosity. When used as a casing or container for meat products, it has the advantages over the natural gut of producing a container which is extremely sanitary, which has great strength, and when attached to a suitable knitted base is elastic within definite limits. The stretchability or elasticity of the casing may be varied depending upon the degree of vulcanization of the rubber compound, the kind of fabric used as the base, and whether the casing is stuffed in wet or dry condition.

For use as a sausage casing, the material is formed into a tube of suitable diameter, either seamed or seamless. The tube, prior to stuffing, is substantially smaller in diameter than when stuffed with the sausage meat, the circumferential elasticity of the material permitting of this expansion.

What I claim is:

1. A sausage casing comprising a circumferentially expansible elastic tube of fabric having a coating layer of a microporous rubber.

2. A sausage casing comprising a circumferentially expansible elastic tube of knitted fabric having a coating layer of microporous coagulated rubber.

3. A sausage casing comprising a tube of knitted material impregnated and coated with microporous vulcanized rubber.

4. A sausage casing comprising a circumferentially expansible elastic tube of fabric impregnated and coated with microporous vulcanized rubber.

5. A container for an edible product comprising a base of knitted fabric having a coating layer of microporous vulcanized rubber adhering to one surface of the base.

6. A sausage casing having properties simulating those of the natural gut comprising a body of a knitted fibrous fabric having a coating layer of porous coagulated rubber containing fillers which render the casing substantially opaque to prevent discoloration of the meat.

LEO A. GOODMAN.